United States Patent
Bargull et al.

[11] Patent Number: 5,839,694
[45] Date of Patent: Nov. 24, 1998

[54] LUGGAGE COMPARTMENT SYSTEM ESPECIALLY FOR A PASSENGER AIRCRAFT

[75] Inventors: Olaf Bargull, Berlin; Bernd Roessner, Rosengarten, both of Germany

[73] Assignee: Daimler-Benz Aerospace Airbus GmbH, Hamburg, Germany

[21] Appl. No.: 763,532

[22] Filed: Dec. 12, 1996

[30] Foreign Application Priority Data

Dec. 12, 1995 [DE] Germany .................. 195 46 302.1

[51] Int. Cl.⁶ .................................................. B64D 11/00
[52] U.S. Cl. ............................... 244/118.1; 244/118.5; 74/97.1; 312/247
[58] Field of Search ............................. 312/27, 242, 325, 312/246, 248, 247, 319.3, 266, 269; 244/118.5, 118.1, 118.2, 119, 129.1, 137.1; 74/97.1, 100.1

[56] References Cited

U.S. PATENT DOCUMENTS

| | | | |
|---|---|---|---|
| 1,147,998 | 7/1915 | Anderson | 312/325 X |
| 1,407,656 | 2/1922 | Jaynes | 312/298 X |
| 3,102,607 | 9/1963 | Roberts | 244/118.5 X |
| 4,275,942 | 6/1981 | Steidl . | |
| 4,368,937 | 1/1983 | Palombo et al. | 312/269 X |
| 4,664,475 | 5/1987 | Ferrer | 244/129.1 X |
| 5,244,269 | 9/1993 | Harriehausen et al. | 312/247 |
| 5,329,865 | 7/1994 | McWard | 312/242 X |
| 5,383,628 | 1/1995 | Harriehausen et al. | 244/118.5 X |
| 5,441,218 | 8/1995 | Mueller et al. | 244/118.5 X |
| 5,456,529 | 10/1995 | Cheung | 312/325 X |
| 5,567,028 | 10/1996 | Lutovsky et al. | 312/248 X |

*Primary Examiner*—Peter M. Cuomo
*Assistant Examiner*—Janet M. Wilkens
*Attorney, Agent, or Firm*—W. F. Fasse; W. G. Fasse

[57] ABSTRACT

A luggage compartment system especially for a passenger cabin of an aircraft is equipped with shells or bins (2) that are suspended from a support structure forming part of the aircraft body, by a four-bar or four-link system, the journals or pivots of which are substantially positioned in or above a reference plane defined by a top wall of the bin so that none of the links nor any of the journals take up space between end walls of longitudinally aligned bins. One journal may even be positioned below the reference plane, but not axially outside the end walls of the bin. Thus, additional space for luggage is gained.

12 Claims, 5 Drawing Sheets

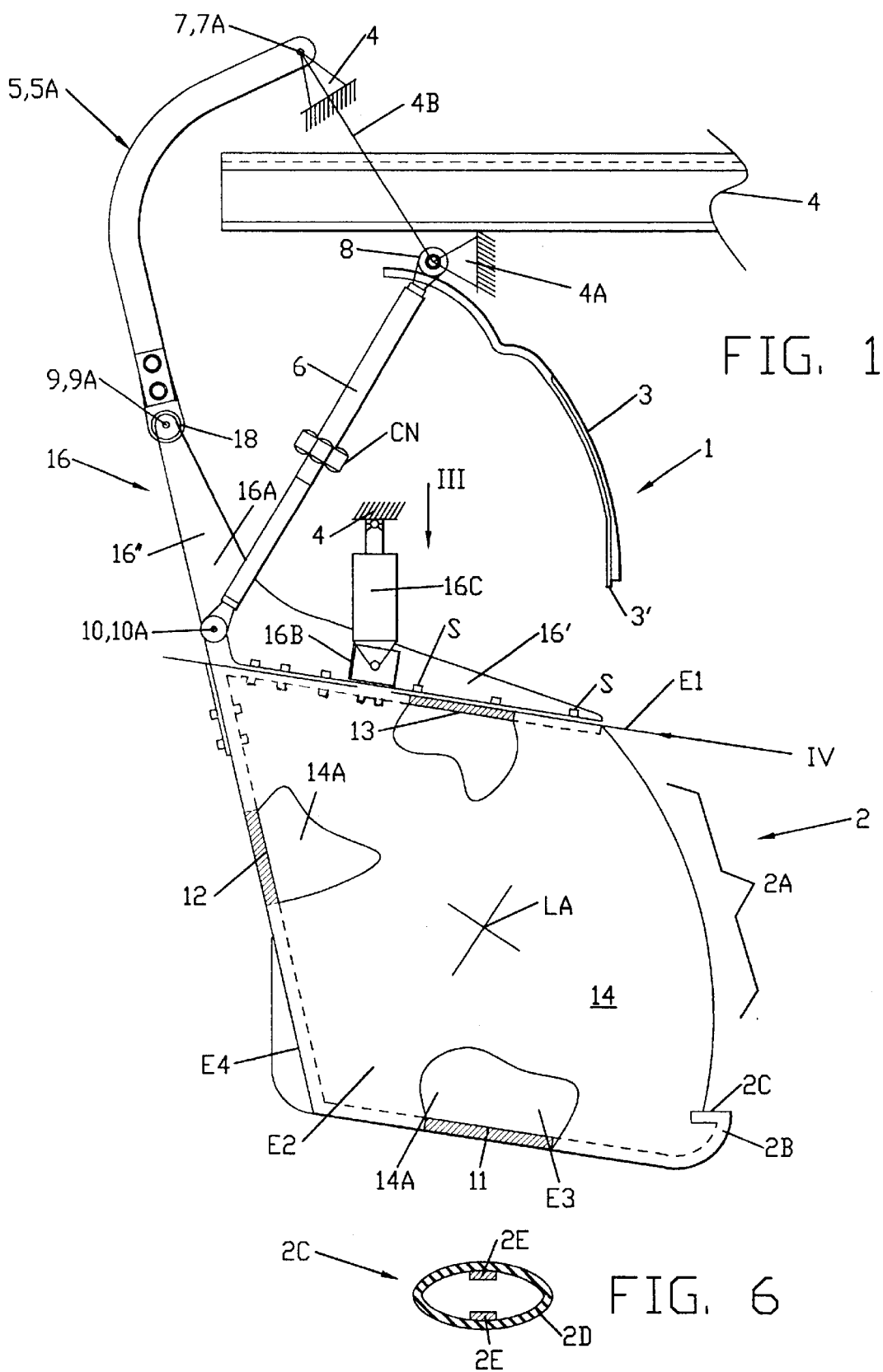

5,839,694

LUGGAGE COMPARTMENT SYSTEM ESPECIALLY FOR A PASSENGER AIRCRAFT

FIELD OF THE INVENTION

The invention relates to a luggage compartment system especially for a passenger aircraft. Each luggage compartment includes a luggage holding shell and at least one four-bar or lever linkage suspending from a fixed supporting structure, such as the aircraft body, for lowering and raising the shell. Loading and unloading is facilitated by lowering the shell.

BACKGROUND INFORMATION

Luggage compartments are mounted under the ceiling in an aircraft cabin above the passenger seats. The luggage compartments can be reached from the aisles. As a rule, each compartment includes a box that is fixed to the supporting structure and serves as a housing for a shell or bin that serves to hold pieces of luggage. The fixed boxes forming housings for the shells are aligned longitudinally with each other along the length of the cabin ceiling. Each housing has end walls that extend perpendicularly to the longitudinal aircraft axis. When the shells are recessed in the housings the entire structure of a plurality of such housings and shells presents an image of a continuous formation. Conventionally, the bar or lever system for raising and lowering the shell into and out of the box housing includes lever components positioned outside the end walls of the respective shells. Thus, substantial space between neighboring, axially and longitudinally aligned shells is required to accommodate the respective lever components.

U.S. Pat. No. 4,275,942 (Steidl), published on Jun. 30, 1981, discloses a stowage bin mechanism of the above type wherein a downwardly open box housing mounted overhead to the aircraft structure above the passenger seats holds a shell with two four-bar linkages, one at each end wall of the shell. These four-bar linkages secure the shell to the housing in such a way that the shell may be lowered out of the upper closed position downwardly into a lower open position for putting luggage items into the shell or for removing luggage from the shell. These down or up movements require that the shell performs a coupled motion, whereby the two four-bar linkages guide this coupled or composite motion. For this purpose, each four-bar linkage has an upper lever 13 and a lower lever 14. The upper ends of both levers are pivotally secured or journalled to fixed points 16 and 17 while the lower ends of the levers 13 and 14 are pivotally secured to the end walls of the shell by journals 11 and 12. The fixed journal points 16 and 17 are substantially vertically aligned with each other. The shell journals 11 and 12 on the shell side walls are not vertically aligned with each other. The connection between the two fixed journals 16 and 17 includes a spring cartridge 18 that functions in the manner of a toggle when the shell is lowered out of the box housing. The two upper levers or bars 13 of a pair of four-link lever systems provided for each shell are interconnected by a so-called torque tube 22. The spring cartridge counteracts gravity and facilitates the lowering and lifting. The shell journals 11 and 12 are positioned in the back portion of the shell side walls, or rather end walls in such a way that the shell opening in the open, lower position of the shell assumes a somewhat tilted attitude to facilitate loading or unloading. The four-bar linkages are not forming a true parallelogram so that the shell can also pivot or rotate while it is being lowered. This feature of the conventional compartment provides an improved accessibility when the shell is lowered. This particular motion is achieved by using the required length for the links and positioning the respective pivots for the four-link lever systems. An axial spacing between neighboring shells is required to accommodate two-bar link systems between neighboring shells or bins. This space required for the linkage is lost for the luggage, because it dictates that the shells themselves must be shorter in the longitudinal aircraft direction than would be necessary if a more efficient space utilization could be accomplished.

OBJECTS OF THE INVENTION

In view of the above it is the aim of the invention to achieve the following objects singly or in combination:

to improve a luggage compartment system in such a way that the luggage holding volume of the shells or bins is increased by avoiding placement of linkage and journal components between longitudinally aligned compartments;

to make sure that the interior of a luggage compartment shell is accessible even if the raising and lowering mechanism should be blocked;

to construct such luggage compartments as lightweight as possible while still assuring the required safety and to avoid the box housings altogether;

to assure a uniform horizontal orientation of the shell during raising and lowering, regardless of the distribution of luggage components inside the shell; and to provide a cover or lid journalled to the fixed support structure of the aircraft, whereby the lid shall be lockable in at least a closed and an opened position.

SUMMARY OF THE INVENTION

The luggage compartment system according to the invention is characterized in that a shell or bin is pivoted to a fixed support structure such as the ceiling support structure in an aircraft body by a four-bar linkage with four pivots or journals, at least three of which are positioned above a first reference plane defined by a top wall of the shell or bin forming the luggage compartment while one further pivot or journal is located either above, or in, or below the first longitudinal reference plan provided that the at least one pivot or journal remains within the confines provided by second and third reference planes defined by outer surfaces of end walls of the bin or shell. This arrangement of all pivots or journal points makes sure that no space is wasted for the four-bar linkage and its journals or pivots neither between the end surfaces of neighboring compartments nor inside the shells or bins so that the end walls facing in the longitudinal direction and extending crosswise to the longitudinal axis of the shell or bin can be placed so close to each other that rubbing of one bin end wall against the neighboring end wall is avoided. Simultaneously, the volume available for holding luggage is increased.

By hinging a lid for the bin or shell to the fixed support structure it is possible to open the bin even if the bin is in its lifted recessed position. This feature assures that the open front of the bin is not restricted by any lid hinge connected to the bin or shell itself.

The passenger comfort is increased by providing a lock for the hinged lid that holds or locks the lid in an open or closed position.

The weight of the system can be reduced by using forked levers or links wherever possible to provide space between the fork ends for a power lift, such as a piston cylinder device. A single lever or bar (e.g. 6) can function as a member of two four-bar linkages.

A safety feature is achieved by providing a sensor that will give a signal if a gap between a downwardly facing edge of the lid or flap and an upwardly facing edge of the bin is obstructed.

BRIEF DESCRIPTION OF THE DRAWINGS

In order that the invention may be clearly understood, it will now be described, by way of example, with reference to the accompanying drawings, wherein:

FIG. 1 shows an end view of the present luggage compartment system in the direction of the longitudinal axis of the system and in its lowered state;

FIG. 6 shows a cross-section through a pressure sensor contact hose for the present bin.

Figures 2, 5:
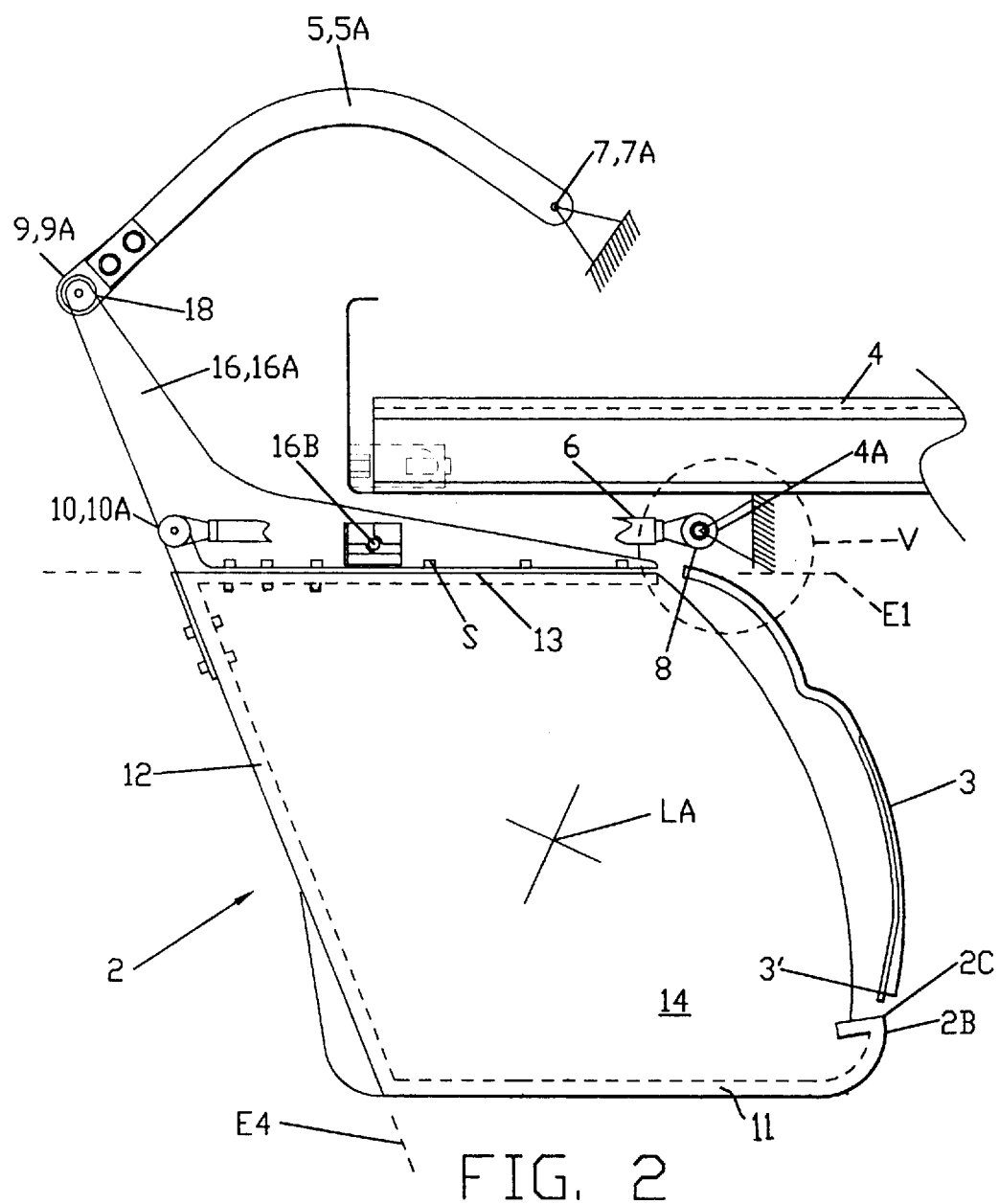
FIG. 2 is a view as in FIG. 1, however illustrating the raised state of the system.
FIG. 5 shows the detail V in FIG. 2 on a somewhat enlarged scale to illustrate the hinging of the lid.

DETAILED DESCRIPTION OF PREFERRED EXAMPLE EMBODIMENTS AND OF THE BEST MODE OF THE INVENTION

FIG. 1 shows the present luggage compartment system 1 in its open or lowered state. The system includes a shell or bin 2 suspended from an overhead fixed support structure 4 such as the ceiling support frame structure of an aircraft body. The bin or shell 2 has a lid 3, which is hinged to a fixed mounting member 4A independent of the bin 2. The system further includes at least one, preferably two four-bar suspension linkages, one of which is provided at each end of the bin 2. The bin 2 comprises a bottom wall 11, a rear wall 12, a top surface or wall 13, defining a first reference plane E1 and an open front 2A. The bin 2 is closed at its axial ends by end walls 14 and 14A forming second and third reference planes E2 and E3 extending perpendicularly to a longitudinal axis LA of the bin. This longitudinal axis LA extends in parallel to the central longitudinal axis of the aircraft body.

Generally, reference numbers supplemented with the letter "A" refer to the far end or center of the system while reference numbers without the letter "A" refer to the near end of the system directly facing the viewer.

Referring further to FIG. 1, the present linkage system includes first, second, third and fourth links. Upper levers or bars 5, 5A form first links. A second link is formed by at least one lower bar 6 which is preferably constructed to be adjustable in its length and lockable in its length once the required length has been adjusted. Third bars 16, 16A are preferably but not necessarily constructed as an angle bracket to be described in more detail below. A fourth bar 4B is formed by the fixed support structure 4 as a rigid connection between the pivots or journals 7, 7A for the upper bars 5, 5A and the pivot or journal 8 for the lower bar 6. The bar 5A is hidden behind the bar 5. Similarly, the bar 16A is hidden behind the bar 16 except where the lower end of the bar 16 is shown broken away. The upper bar 5 is pivoted to the journal 7 which in turn is rigidly supported by the support structure 4. The bar 5A is similarly pivoted by the journal 7A also secured to the support structure 4. The lower ends of the upper bars, 5, 5A are connected by journals 9, 9A to the upper ends of the third links or bars 16, 16A. The upper end of the lower bar 6 is secured by a journal or pivot 8 to a fixed mounting bracket 4A positioned centrally above the top wall 13. This fixed mounting bracket 4A is preferably also used for hinging the lid 3 to the support structure 4 as will be described in more detail below with reference to FIG. 5. Two or more such brackets 4A may be used. The lower end of the lower bar 6 is preferably but not necessarily forked and connected by journals 10, 10A to the top wall 13 of the bin 2 preferably above the first reference plane E1 defined by the top wall 13 symmetrically to a central cross-plane CP best seen in FIGS. 3 and 4.

According to the invention the journals 7, 7A and 8 that are fixed to the support structure 4, 4A, for example by suitable brackets and the journals 9, 9A, 10, 10A are indirectly connected to the bin 2. As shown all journals are positioned above the first reference plane E1 and within the confines of the second and third reference planes E2 and E3 thus leaving space at the ends inside the bins and between longitudinally aligned bins completely free of any obstructions.

The third bar 16, 16A is preferably constructed as an elbow-shaped bracket having a first leg 16' rigidly secured, for example by screws S to the top wall 13 of the bin 2 and a second leg 16" extending upwardly, preferably as an extension of or within a fourth reference plane E4 defined by the rear wall 12 of the bin 2. In an alternative embodiment the third bar 16, 16A may be a straight bar connected with its lower end to the rear wall 12. The upper levers or bars 5, 5A also have an elbow configuration.

Figure 3:
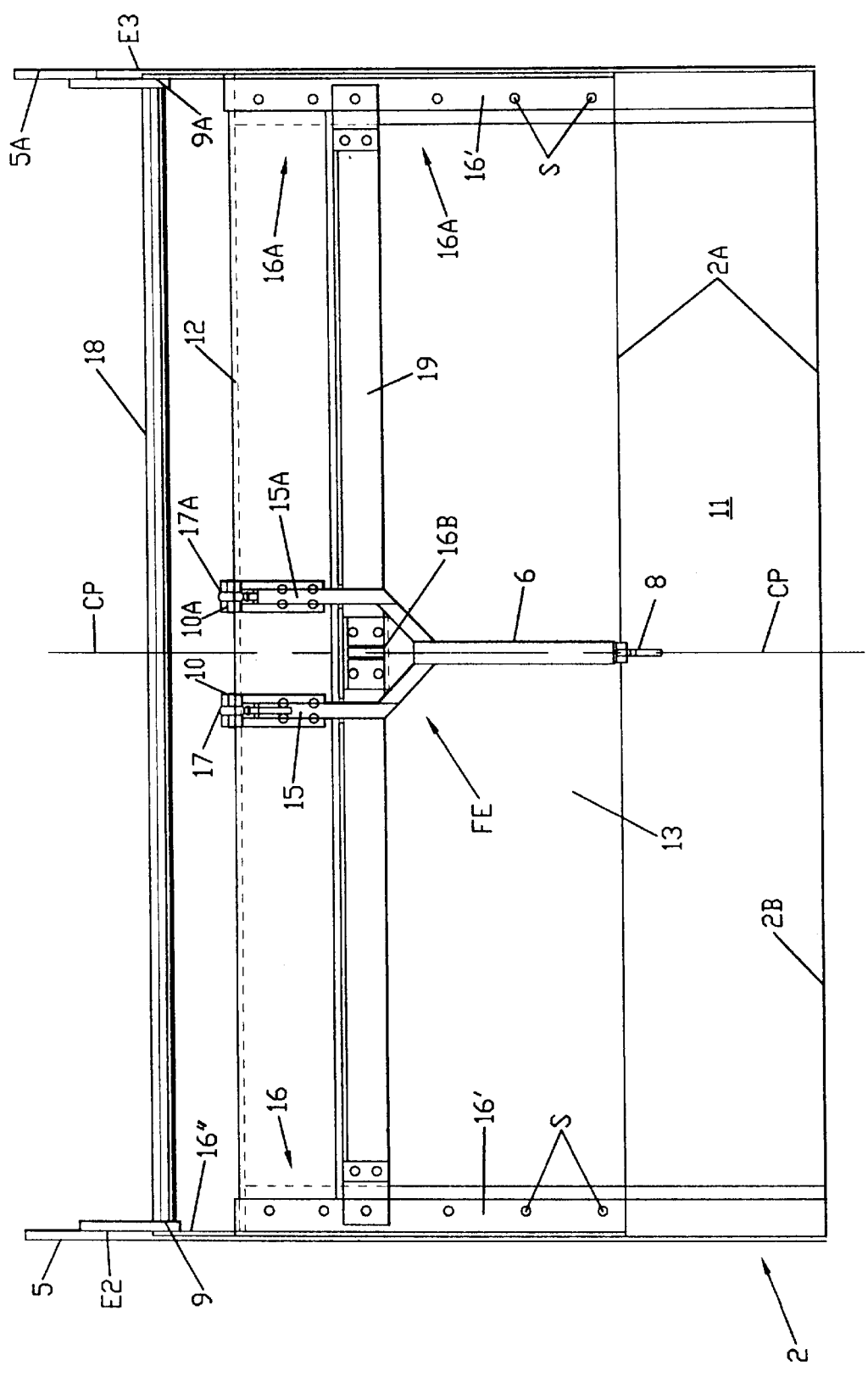
FIG. 3 is a plan view in the direction of the arrow III in FIG. 1.
Figure 4:
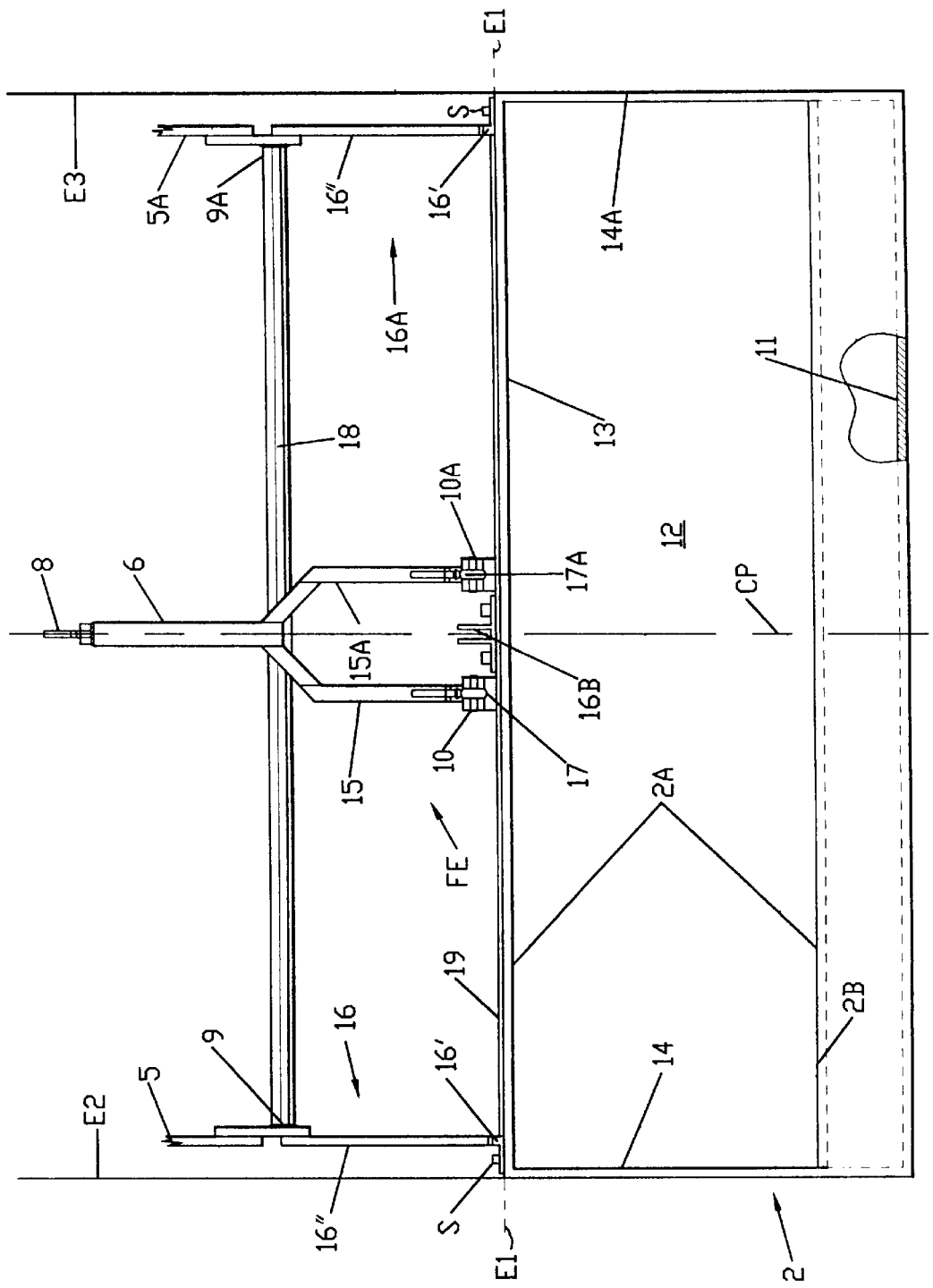
FIG. 4 is a view in the direction of the arrow IV in FIG. 1.

As shown in FIGS. 3 and 4, one end of the lower lever 6 is preferably constructed as a forked end FE while its other end has but one eye connected by the journal 8 to the fixed support bracket 4A. The forked end FE has two legs 15, 15A with journal eyes 17, 17A held in journal brackets 10 and 10A.

In the illustrated example embodiment the journal brackets 10, 10A are secured to the top wall 13 in the area of the rear edge of the bin 2, whereby the respective journal axes of the journal brackets 10, 10A extend in the fourth reference plane E4 defined by the backwardly facing rear surface of the rear wall 12. The other bin journals 9 and 9A are secured to the upwardly pointing ends 16" of the elbow brackets 16 and 16A substantially in the second and third reference plane E2, E3. These upwardly pointing legs 16" also extend substantially in the fourth reference plane.

The lifting for bringing the bin 2 from the position of FIG. 1 into the position of FIG. 2 is performed by applying an upwardly directed force to the bin 2, for example by one or two piston cylinder devices 16C connected between the support structure 4 and mounting brackets 16B secured to a cross-bar 19 connected to the top wall 13 as seen in FIGS. 1, 3 and 4 viewed together. The piston cylinder device 16C is not shown in FIGS. 3 and 4 to not obstruct the bracket 16B. In response to the upwardly directed force the upper levers 5 and 5A and the lower lever 6 perform a tilting motion about the journal 7, 7A and about the journals 10, 10A, respectively.

The lid 3 is not participating in any downward or upward movements of the bin 2 because the lid 3 is hinged to a fixed support bracket 4A as will be described below with reference to FIG. 5. However, when the bin 2 is in the raised position of FIG. 2, the lid 3 will properly close the interior of the bin 2, whereby the lower edge 3' may lightly contact the loading edge 2B of the bin 2 to thereby close the interior of the bin 2.

The lifting and lowering of the bin 2 may normally be performed manually. However, for passenger comfort it is useful to apply a mechanical force other than the manual force of the user, for example by the above described piston cylinder device 16C, which may be replaced by tension springs, gas springs, motor drives of any suitable type, including respective damping elements for moving the bin 2 in a controlled manner.

According to the invention it is preferred that a control of a driving motor or driving piston takes place through a safety circuit arrangement to make sure that a power driven closing or rather lifting of the bin 2 is automatically interrupted when an obstruction is present between the lower edge 3' of the lid 3 and the upwardly facing edge 2B of the bottom 11 of the bin 2. In order to sense the presence of such an obstruction, it is possible to use microswitches in combination with a so-called contact hose 2C shown in FIG. 6 or a contact molding installed along the edge 2B. A contact hose 2C for example, has two electrically conducting metal strips 2E along inner surfaces of a flexible electrically insulating hose body on diametrically opposite sides thereof. When the hose is squeezed together an electrical signal is generated or an electrical circuit is closed as long as the force is applied, for example if the presence of an obstacle is sufficient to press the contact hose 2C together so that the contact strips 2E touch each other.

Referring to FIG. 2, in the closed position the lines connecting the journals 9 and 7 on the one hand and the journals 9A and 7A on the other hand extend approximately horizontally. Correspondingly, the lever or bar 6 also extends approximately horizontally because now the bin journals 10 and 10A are positioned approximately at the same level as the journal 8 secured to the fixed bracket 4A. The luggage system is locked during flight in the upper lifted position. However, the separately operable lid 3 can be opened by tilting about an axis 3A shown in FIG. 5.

FIG. 3 shows the view direction III onto the top wall 13 and the levers 5 and 5A with their journals 9 and 9A connected to the upper legs 16" of the respective elbow link 16 and 16A. The journals 7 and 7A of the upper links 5 and 5A are not visible in FIG. 3. The journals 9 and 9A are rigidly interconnected with each other through a rigid crossbar 18 which enforces a synchronous operation of the upper links 5 and 5A even if the shell 2 should be loaded unevenly.

FIG. 4 illustrates the view in the direction of the arrow IV in FIG. 1, which is essentially a view into the open front 2A of the bin 2. The components shown in FIG. 3 are also seen in FIG. 4, however, from a different direction. The first reference plane E1 is seen as a horizontal line while the second and third reference planes E2 and E3 are seen as dashed vertical lines in FIG. 4. The axially outwardly facing surfaces of the end walls 14 and 14A define the second and third reference planes E2, E3 respectively. In the shown example embodiment of the invention all journals 7, 7A; 8; 9, 9A; and 10, 10A are positioned above the top wall 13, or rather above the first reference plane E1 and additionally within the confines of the second and third reference planes E2, E3. The journals 10 and 10A are shown slightly above the plane E1 positioned symmetrically to the central plane CP. However, they could be located directly in the plane E1 shown in FIG. 3 or even slightly below the plane E1 which is possible because the upper left-hand corner in the center of the bin 2 opposite the open front 2A as viewed, for example in FIG. 2, is normally not occupied by luggage.

Figure 7:
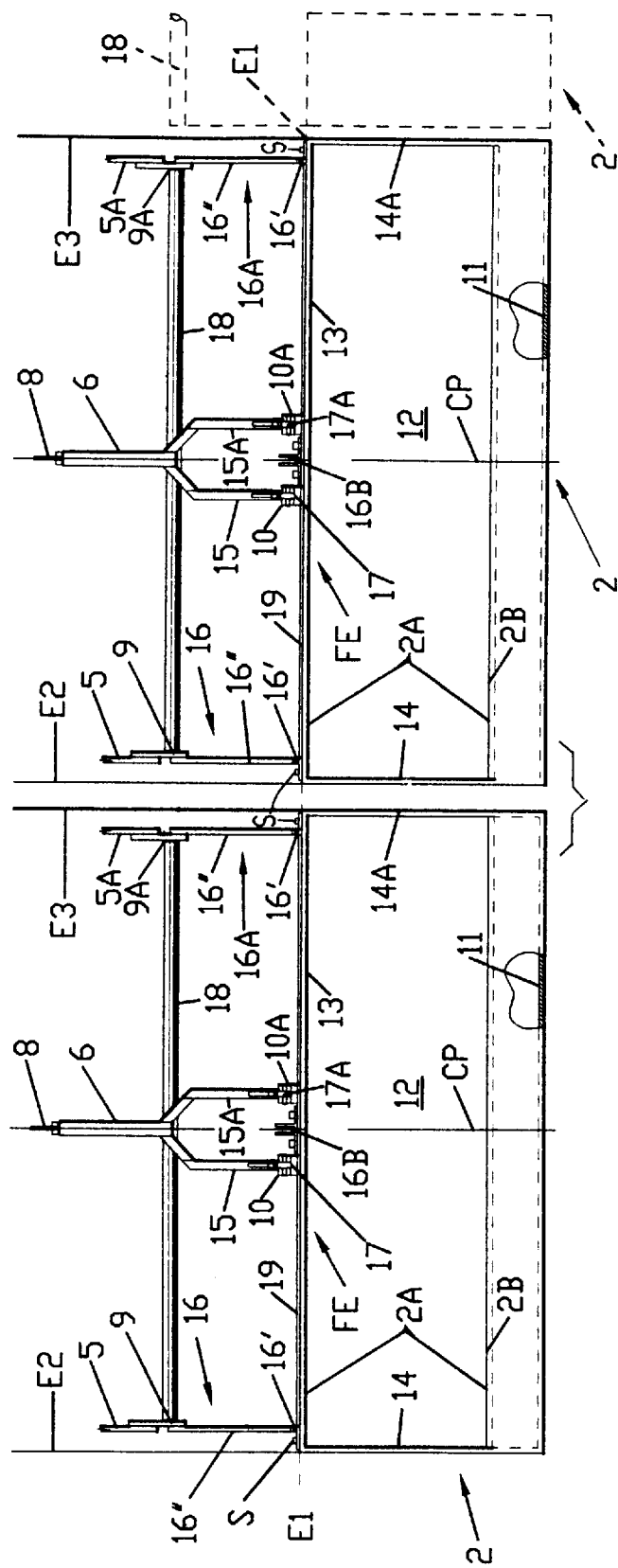
FIG. 7 shows schematically a view in the direction of the arrow IV in FIG. 1 but illustrating a plurality of luggage compartment shells arranged in a row.

According to the above described arrangement of the journals 5, 5A, 7, 7A, 8, 9, 9A, 10 and 10A above or in the first reference plane E1, the invention assures that neither connecting links 5, 5A; 16, 16A; and 6 nor journals are interfering with the space between two neighboring bins in the longitudinal direction. In other words, the end walls 14, 14A can be positioned almost in contact with each other as shown in FIG. 7, whereby these bins can be correspondingly longer to provide more luggage space.

FIG. 5 shows the detail V of FIG. 2 to illustrate the hinging of the lid 3 by a hinge 3A to the fixed mounting bracket 4A which in turn is connected to the support structure 4. The lid 3 is shown in FIGS. 1 and 2 in a position in which the bin 2 is closed if it is in its upper position as shown in FIG. 2. In FIG. 5 the lid 3 is shown in an intermediate position or halfway open position. The lid 3 may assume a locked-closed position and a locked-open position, whereby both positions can be assumed independently of the position of the bin 2. For this purpose a locking mechanism 20 includes a spring 21 secured to the bracket 4A for pressing a locking ball or pin 22 against a notched disk or cam 23 rigidly secured to the hinge 3A of the lid 3. The cam 23 rotates with the lid 3 about the hinging axis of the hinge 3A. The disk 23 is provided with stop notches 3B and 3C. The spring 21 is received in a bore of the bracket 4A and presses the ball or pin 22 into one of the notches 3B, 3C but the lid can be moved by overcoming the spring force. The angular spacing around the disk 23 between the notches 3B and 3C determines the hinging range of the lid 3. The cooperation of the spring biased ball or pin 22 with any of the notches 3B or 3C normally prevents the tilting of the lid 3 outside this permissible range. Due to the ability to open the lid 3 in the upward position of the bin 2, access to the luggage is provided even if the bin 2 is not supposed to be lowered for example during flight or when it is stuck.

Incidentally, the forked end FE of the single lever 6 is so dimensioned and the fork legs 15, 15A so spaced that movement of the lever or bar 6 will not interfere with the operation of the lifting device 16C and vice versa. If the lifting device 16C is not positioned in the central plane CP, the single lever 6 will not need a forked end.

The length of the lever 6 could be adjusted by making the lever 6 in two sections, one section having an axial bore with a female threading and the other section having a male threading engaging the female threading in the bore and carrying a counter nut NC shown in FIG. 1 that can be tightened once the required length for the lever has been adjusted.

Although the invention has been described with reference to specific example embodiments, it will be appreciated that it is intended to cover all modifications and equivalents within the scope of the appended claims.

What is claimed is:

1. A luggage compartment system comprising a fixed ceiling support structure (4) in an aircraft, said system further comprising a plurality of luggage compartment shells (2) for holding luggage, each of said shells including a bottom wall (11), a rear wall (12), a top surface (13), and an open front (2A), said shells further including a common longitudinal axis (LA), each of said two end walls (14, 14A) extending substantially perpendicularly to said longitudinal axis, said top surface (13) of each shell defining a first reference plane (E1), said end walls (14, 14A) defining second and third reference planes (E2, E3), said system further comprising a lifting and lowering mechanism including at least one four-bar linkage with four journals (7, 8, 9, 10) for each of said shells (2), said four journals pivoting said four-bar linkage to said fixed support structure (4) and to its respective shell (2) of said plurality of shells, at least three of said four journals being positioned above said first reference plane (E1) of each shell and one of said four journals being positioned so that space axially outside said second and third reference planes is free of any of said four journals, whereby neighboring shells substantially abut each other in a direction of said longitudinal axis (LA).

2. The luggage compartment system of claim 1, further comprising a lid (3) for each shell, a hinge (3A) securing each said lid to said fixed support structure in a position for normally closing said open front (2A) of each of said shells (2) in an upper recessed position.

3. The luggage compartment system of claim 2, wherein each said hinge (3A) comprises a catch (21, 22, 23) for locking said lid (3) at least in an open position and in a closed position of said shells (2).

4. The luggage compartment system of claim 1, wherein said at least one four-bar linkage on each of said shells (2) comprises an upper link (5 or 5A), a lower link (6), a side link (16), and a fixed link (4B), said lower link (6) having at least one forked end (15, 15A).

5. The luggage compartment system of claim 4, wherein said lower link (6) is adjustable in its lengths, and includes a stop member (CN) for locking said lower link (6) at an adjusted link length for each of said shells (2).

6. The luggage compartment system of claim 1, wherein each of said shells (2) comprises a lower edge (2B) along said front opening (2A) and a pressure sensor (2C) along said lower edge (2B) for activating a safety circuit to stop an upward movement of each of said shells (2) when said front opening (2A) is obstructed.

7. The luggage compartment system of claim 6, wherein said pressure sensor comprises a flexible contact hose (2C) attached to and along said lower edge (2B) of each of said shells (2), said flexible contact hose comprising an outer electrically insulating hose (20) and two electrically conducting contact strips (2E) secured to inner surfaces of said outer hose diametrically opposite each other.

8. The luggage compartment system of claim 1, wherein at least one bar of said four-bar linkage has an elbow configuration for at least one of said shells (2).

9. The luggage compartment system of claim 1, comprising two sets of said four-bar linkage for each shell (2), whereby one set is arranged at each end of each of said shells (2) within confines of said second and third reference planes (E2, E3) without projecting axially outside said end walls (14, 14A).

10. The luggage compartment system of claim 9, wherein each four-bar linkage set comprises an upper lever or bar (5, 5A), a side lever or bar (16, 16A), a lower lever or bar (6), and a fixed link (4B) for each of said shells (2).

11. The luggage compartment system of claim 10, wherein said top surface is a top wall, and wherein said lower lever or bar (6) is a single lever or bar journalled at one end (8) to said fixed support structure (4A) and at the other end to said top wall (13) centrally and symmetrically between said second and third reference planes (E2, E3), whereby said single lever or bar (6) functions as a member of each of said two sets of four-bar linkages provided for each of said shells (2).

12. The luggage compartment system of claim 11, further comprising a power lifting device (16C), wherein said single lever or bar (6) has at least one forked end (15, 15A) to provide a central space on and above said top wall (13) for a mounting bracket (16B) for connection to said power lifting device (16C) and to a respective shell of said shells (2).

* * * * *